Aug. 31, 1948.    H. G. BUSIGNIES    2,448,016
INSTRUMENT LANDING SYSTEM
Filed Jan. 26, 1944    6 Sheets-Sheet 1

INVENTOR.
HENRI G. BUSIGNIES
BY
R P Morris
ATTORNEY

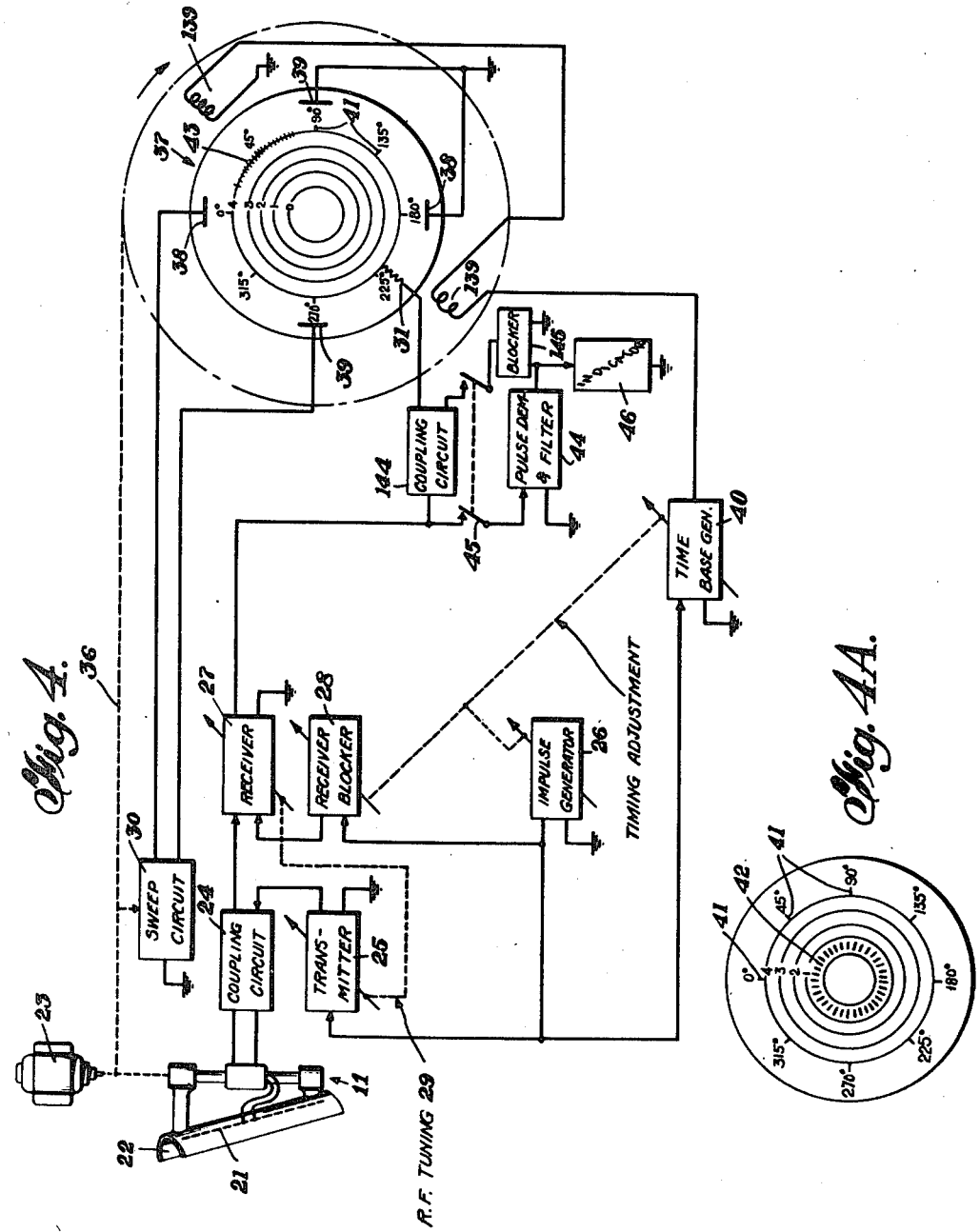

Aug. 31, 1948.                H. G. BUSIGNIES                 2,448,016
                          INSTRUMENT LANDING SYSTEM
Filed Jan. 26, 1944                                          6 Sheets-Sheet 3
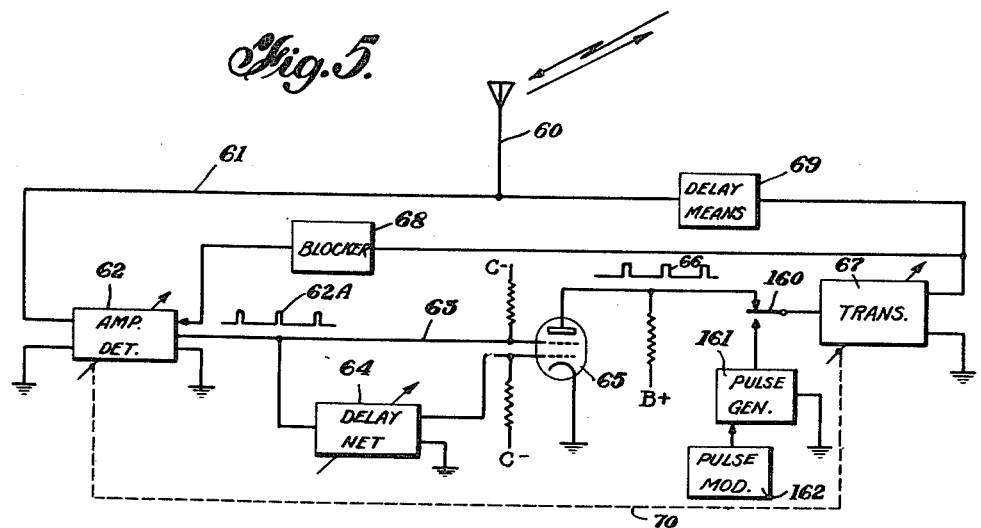
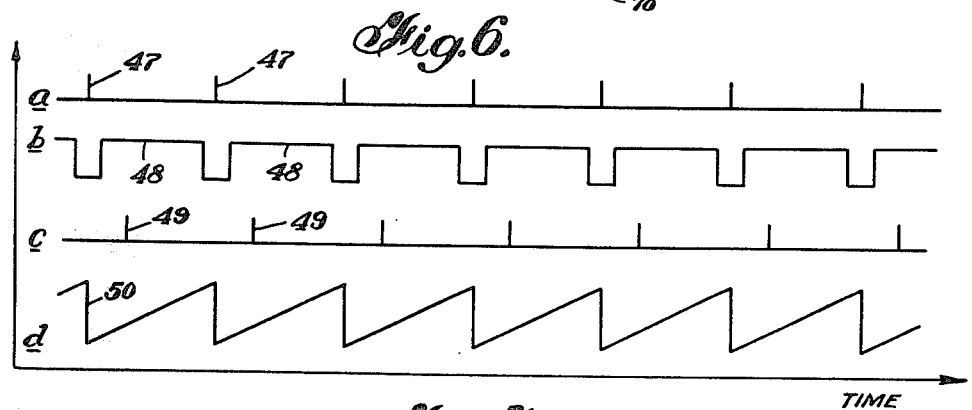
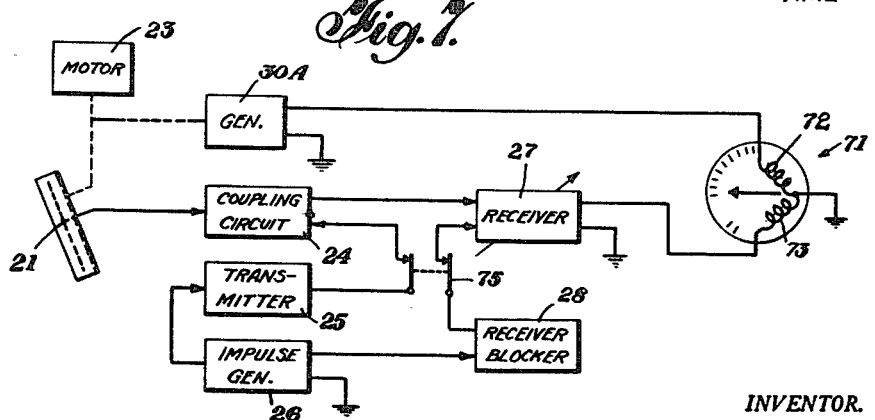
INVENTOR.
HENRI G. BUSIGNIES
BY
R P Morris
ATTORNEY Aug. 31, 1948.  H. G. BUSIGNIES  2,448,016
INSTRUMENT LANDING SYSTEM
Filed Jan. 26, 1944  6 Sheets-Sheet 4
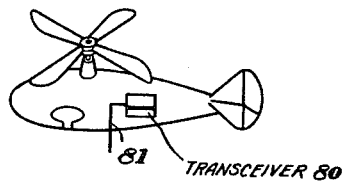
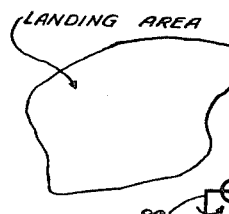
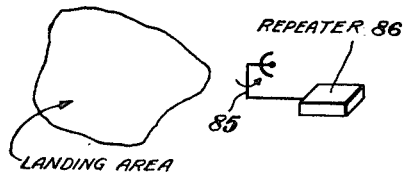
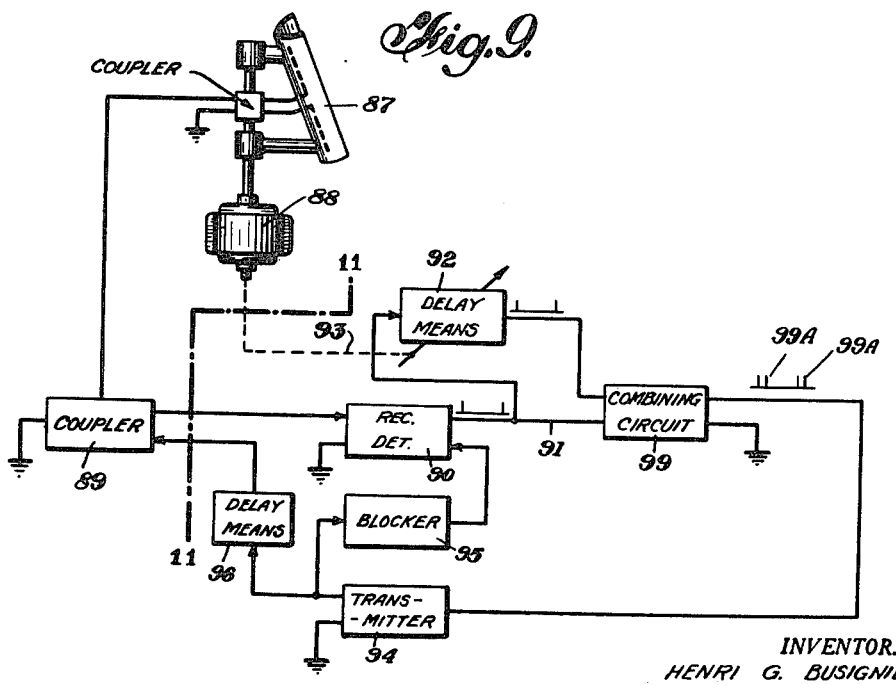
INVENTOR.
HENRI G. BUSIGNIES
BY
ATTORNEY Aug. 31, 1948.   H. G. BUSIGNIES   2,448,016
INSTRUMENT LANDING SYSTEM
Filed Jan. 26, 1944   6 Sheets-Sheet 5
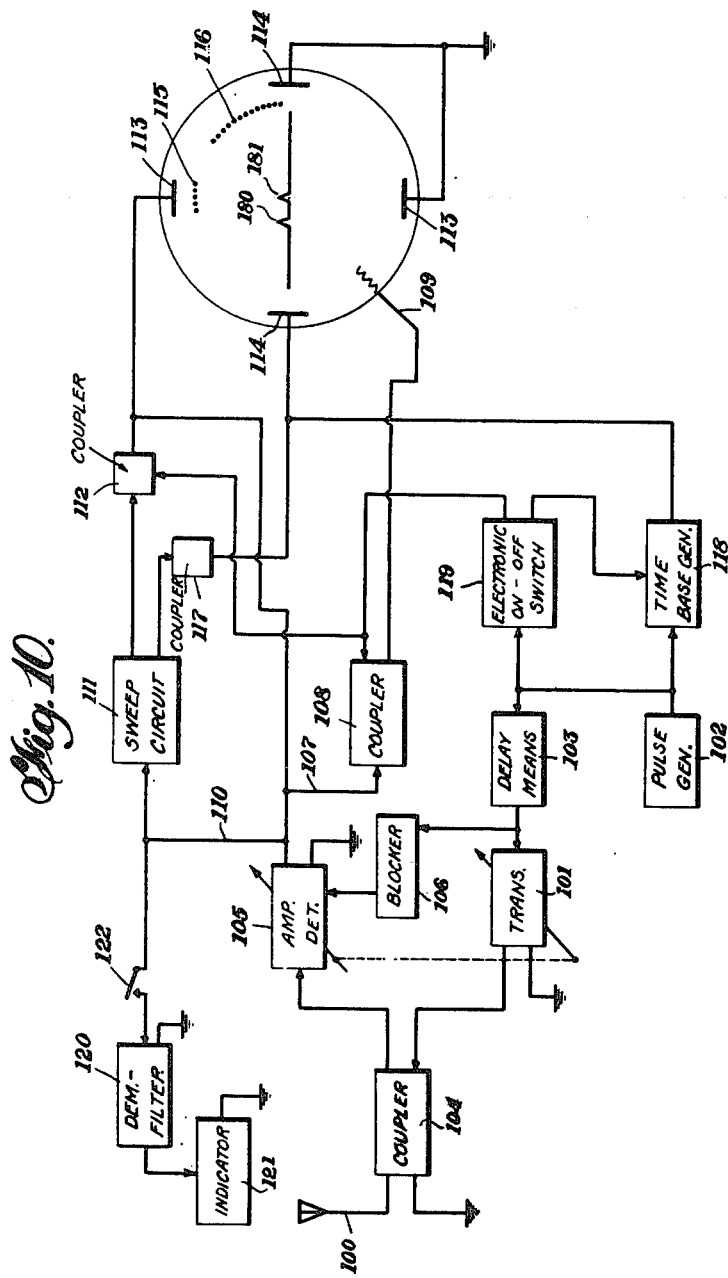
INVENTOR.
HENRI G. BUSIGNIES
BY
RP Morris
ATTORNEY Aug. 31, 1948.                H. G. BUSIGNIES                2,448,016
                         INSTRUMENT LANDING SYSTEM
Filed Jan. 26, 1944                                    6 Sheets-Sheet 6
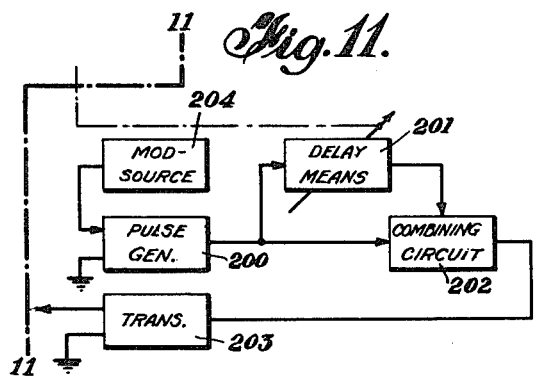
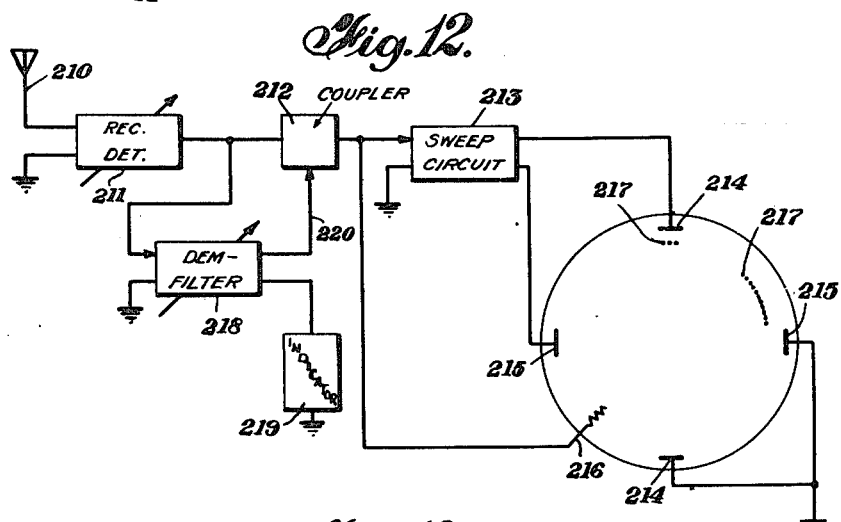
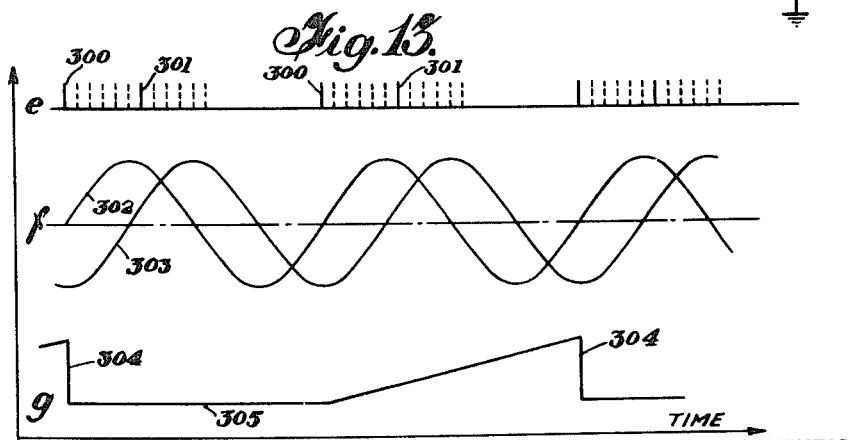
INVENTOR.
HENRI G. BUSIGNIES
BY
ATTORNEY Patented Aug. 31, 1948

2,448,016

UNITED STATES PATENT OFFICE 2,448,016

INSTRUMENT LANDING SYSTEM

Henri G. Busignies, Forest Hills, N. Y., assignor to Federal Telephone and Radio Corporation, New York, N. Y., a corporation of Delaware Application January 26, 1944, Serial No. 519,764

20 Claims. (Cl. 343—9)

This invention relates to radio beacons and more particularly to systems for guiding mobile craft or other vehicles to a particular beacon.

Radio beacons are commonly used to guide aircraft or other vehicles along a desired course or to a particular landing field. In such systems, the guiding indications may be provided on the vehicle, either by a directionally selective receiv-antenna or directional beacon antenna radiators. Such beacon systems require a cooperation between the beacon transmitter and the beacon receiver antenna.

It is an object of my invention to provide a radio beacon system and method particularly useful for guiding aircraft which can land at a very steep angle to the earth, such, for example, as helicopters, to a landing.

It is a further object of my invention to provide a new form of omni-directional radio beacon.

It is a still further object of my invention to provide a receiver for use with a radio beacon system equipped with a novel direction indicating system.

It is a still further object of my invention to provide a radio beacon system in which transceiver equipment is provided on the craft and repeater equipment is provided at fixed points for use as a beacon transmitter.

According to a feature of my invention, a system is provided particularly useful for guiding helicopters or similar aircraft to a landing field. In this system, transmitting and receiving antennas, referred to generically as radiant acting means, may be provided on the ground near the landing point, and on the craft, respectively. The radiation pattern of one of these antennas is made unidirectional, but with a substantial component in the vertical line including the antenna, and is rotated at a predetermined speed. This rotation produces in the output of the craft receiver a pattern varying in strength in the different directions around the craft in all positions of the craft, except when the craft is directly above the transmitter. Thus, by providing a suitable control voltage on the craft and an indicator which provides a comparison of this control voltage and the received energy an indication of position of the craft with respect to the beacon is obtained.

If the directional antenna is on the craft, the control voltage may be obtained from a source operated in synchronism with the rotatable antenna. If, however, the directional antenna is at the fixed stations, the control voltage must be obtained from the energy received on the craft from the fixed station. This may, for example, be derived from a transmitted control signal transmitted when the antenna is aligned in a particular direction.

The beacon transmitters may, if desired, be in the form of radio repeaters triggered into operation by energy transmitted from the craft. In this case, the indicators on the craft may be adjusted to provide distance indications as well as direction indications, using the triggering pulses to generate a time base voltage for the indicators.

These and other objects and features of my invention will be better understood and appreciated from the following description of embodiments and modifications thereof, described for purposes of illustrations with reference to the accompanying drawing, in which:

Fig. 4 is a circuit diagram partly in block digram of aircraft equipment in accordance with an embodiment of my invention;

Fig. 4A is an illustration of an indicator shown in Fig. 4;

Fig. 5 is a block circuit diagram of a fixed station designed to cooperate with the receiver of Fig. 4;

Fig. 6 is a set of curves used to describe the system of Figs. 4 and 5;

Fig. 7 is a block diagram of a simplified receiver usable with the fixed station of Fig. 5;

Fig. 8 is an illustration of the general arrangement of modified beacon system;

Fig. 9 is a block diagram of a fixed station system used with the system of Fig. 8;

Fig. 10 is a block diagram of a mobile station used with the system illustrated in Fig. 8;

Fig. 11 is a modified form of the transmitter circuit which may be substituted for the part shown to the right of line 11—11 of Fig. 9;

Fig. 12 is a simplified block diagram of a receiver for use with the circuit shown in Figs. 9 and 10; and Fig. 13 is a set of curves used in illustrating the operation of a receiver circuit such as illustrated in Fig. 10.

Figure 1:
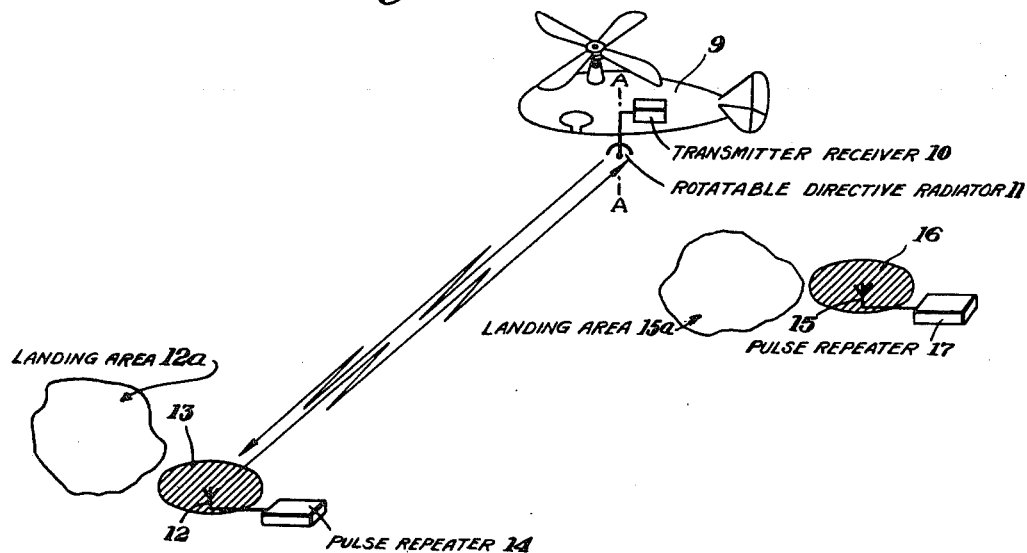
Fig. 1 shows the general arrangement of a beacon system in accordance with my invention.
Figure 2:
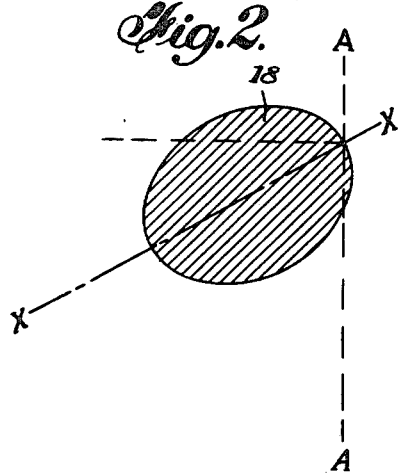
Figs. 2 and 3 are diagrams of radiation field patterns of the transceiver system of Fig. 1.
Figure 3:
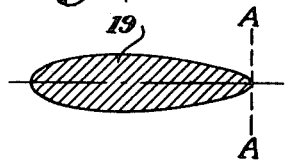

Turning first to the system illustrated in Fig. 1, there is shown an aircraft 9 provided with a transmitter-receiver equipment 10 and a rotatable directive radiant acting member 11. Energy from transmitter-receiver 10 may be repeated at any one of a plurality of radio beacons such as pulse repeaters 14 and 17 by means of antennas 12 or 15. The radiation patterns of the repeater stations are omni-directional in the horizontal field but contain vertical radiation components in all directions, as illustrated in the patterns shown at 13, 16. Preferably, the rotatable directive radiator 11 is provided to produce a radiation pattern, as shown in Figs. 2 and 3. In the vertical plane a section through the radiation pattern shows in the form of curve 18 of Fig. 2 having its center of radiation on the line A—A. It will be noted, therefore, that this radiation pattern has a downward vertical component from the center of radiation of the system so that even when the craft is directly over the beacon, an indication may be provided.

For the same reason the beacon patterns 13 and 16 of Fig. 1 also have no zone which would normally provide the so-called cone of silence. Preferably, the pattern from the rotatable radiator 11 is relatively narrow in the horizontal field and a section across line X—X of Fig. 2 will have a cross section substantially similar to that shown at 19 of Fig. 3.

With the arrangement generally shown in Fig. 1, an aircraft 9, shown as a helicopter, which can land substantially in the vertical plane, may be guided to a position directly over a selected radio beacon. The craft may then descend maintaining its position directly over the beacon until it is sufficiently close to the ground for landing lights there to be visible, at which time it can move to one side of a landing spot or area 12A or 15A removed from the beacon. Preferably, each of the separate landing beacons is distinguished by a different identifying characteristic and the equipment on the craft is made adjustable so that indications thereon may be made from a single one of the selected beacons.

A better and more complete understanding of the detailed operation of the system illustrated in Figs. 1, 2 and 3 may be had by reference to the specific receiver and transmitter arrangements shown in Figs. 4, 4A and 5. In Fig. 4 the aircraft equipment is shown, the radiant acting member 11 comprising an antenna element 21 provided with a cylindrical parabola reflector 22. A motor 23 is provided to rotate this equipment at a predetermined speed so as to traverse the directive pattern over a 360° arc. The antenna is coupled through coupling circuit 24 to a transmitter 25 and a receiver 27. Energy from an impulse generator 26 is applied to a transmitter 25 so as to transmit from antenna 21 a series of spaced pulses. A receiver-blocker arrangement 28 is provided for blocking receiver 27 during the periods that pulses from generator 26 are being transmitted. These transmitted pulses are sent to a repeater mechanism such as shown in Fig. 5 and the repeated signals are returned to antenna 21. These received signals are detected in receiver 27 and applied to a control grid 31 of a cathode ray indicator 37. Simultaneously, with rotation of the directive pattern at antenna 21, a sweep circuit 30 is operated which provides a sweep voltage for deflection plates 38 and 39 of indicator 37 causing the cathode ray beam normally to tend to rotate at the speed of rotation of antenna 11. The beam, however, is rendered visible only when energy from the receiver 27 is applied to the control grid 31. As a consequence, indications will be provided only when there is a coincidence of vectors from the radiation pattern of antenna 21 and the corresponding beacon pattern from one of the radio beacons. This indication will be provided over an arc of a circle, as indicated at 43, the center portion being more brilliant and giving a true indication of the direction to the station. As the craft approaches the beacon, the arc will tend to become greater so that when the craft is directly over the beacon a circular indication, as shown at 42 of Fig. 4A, will be obtained.

Without more, the indicators, as shown, will provide an indication of the direction toward the station. However, it may be desirable to also incorporate an indication of the distance as well as the direction. To this end, a time base generator 40 is provided which serves to produce a sweep voltage sweeping the beam inwardly, the periods corresponding to the repetition rate of the pulses from generator 26. This sweep voltage is applied to deflection coils 139, which are rotated in synchronism with antenna 11, by motor 23. As shown, this beam is normally fixed at zero position at the center of the screen and reaches its maximum position at the outer rim spaced from the center. Since there is normally a certain amount of delay of the transmitted pulses at the repeater station, a zero distance on the cathode ray radio sweep will not correspond to the center of the disc but will be spaced therefrom as indicated at zero. As shown in Fig. 4, the indication of direction is at substantially 45° with respect to the beacon and at a distance of four miles therefrom. However, in Fig. 4A, the craft is directly over the beacon and at a distance of approximately ½ mile therefrom.

In order that the receiver be rendered responsive to a single selected beacon, the transmitter-receiver arrangement 25, 27 may be tuned to different radio frequencies by means of common radio frequency tuning control 29.

On the other hand, the beacons may be distinguished from one another by pulse repetition rate frequencies in which case the impulse generator and the receiver-blocker and time base generator may be adjusted in accordance with a selected repetition frequency rate.

The repeater arrangement for use with the system may be of any desired type, an example of which is illustrated in Fig. 5. In accordance with this arrangement, the pulses from transmitter 25 are received on antenna 60 and applied over line 61 to amplifier detector 62 providing in the output thereof a series of pulses, as shown at 62A. These pulses may be applied directly over a line 63 to a control grid of mixer tube 65 and over a delay network 64 to another control grid of this tube 65. The two grids of this tube are both biased negatively and will not pass the pulses unless pulses are applied simultaneously to both of the grids. By selecting the delay of network 64 to provide a delay of one period of the pulses, this series of pulses will be repeated in the output, as shown at 66. These pulses are then applied to modulate transmitter 67 which serves to block amplifier detector 62 over blocker circuit 68 and to apply the pulses to antenna 60 for transmission back to the craft. A delay means 69 is provided in the energizing circuit of antenna 60 to allow sufficient time for the pulses to block amplifier detector 62 before the transmission of these repeated pulses from antenna 60.

It can be seen that with the circuit thus far described, the equipment of Fig. 4 may transmit a series of pulses as shown at 47, curve a, of Fig. 6. During the transmission of these pulses, the receiver is blocked and is unblocked only during the portion of the period 48, as shown by curve b, Fig. 6. During this unblocking period, at a time determined by the delay in the repeater and the distance of the receiver from the repeater, a series of pulses 49 will be received on the craft which pulses may be used to provide the direction indication. At the same time, a series of sawtooth time base pulses 50 may be generated under control of pulses 47, serving to sweep the cathode ray beam inwardly and outwardly in accordance with time so that the directional indications will be spaced from the center to provide a further indication of the distance of the craft from the beacon station.

It should further be noted that, if desired, the repeater of Fig. 5 may be used merely as a beacon transmitter. For this purpose, a switch 160 may be moved to its lower position connecting transmitter 67 to pulse generator 161. The pulses 161 may be modulated by a characterizing signal, for example, by a particular tone frequency, or a variation in pulse spacing, by means of pulse modulator 162. The receiver part of the repeater is not used and may, if desired, be dispensed with. On the craft a pulse demodulator and filter 44 is provided which may be connected by means of switch 45 to the output of receiver 27. Thus, upon receipt of a beacon signal properly modulated with the desired identification signal, an indication thereof will be provided on indicator 46 so that by simultaneously reading 46 and the cathode ray tube, the direction and identity of the station may be obtained.

In some instances, it may be preferable to provide an arrangement for permitting only the pulses characterized by the desired signal to be applied to indicator 37. To accomplish this, the output of pulse demodulator and filter 44 may be applied to a coupling circuit 144 over blocker 145 so that grid 31 will be energized only at such times as the output from pulse demodulator and filter permits. With this arrangement then, the direction of the craft with respect to the station may be readily obtained.

A further simplified receiving circuit which may be used with the repeater of Fig. 5, when distance indication is not important, is shown in Fig. 7. In this arrangement, the antenna 21, motor 23, coupling circuit 24, transmitter 25, impulse generator 26, receiver 27 and receiver-blocker 28 may all be the same as the corresponding elements shown in Fig. 4. Receiver 27 should, however, be provided with automatic volume control so that the output level of the receiver is maintained substantially constant. However, in place of a sweep generator, a simple voltage generator 30A is provided driven by motor 23. The output from generator 30A and from receiver 27 are applied to separate coils 72, 73 of a zero center meter 71. Thus, when the craft is headed directly toward the station, the meter may be in the center but upon departure of the craft from the desired direction, the meter reading will be off to one side or the other so that the craft may be guided to the beacon. When the beacon of Fig. 5 is not used as a repeater but as a simple transmitter arrangement, switch 75 may be operated disconnecting the transmitter equipment from antenna 21.

In Fig. 8 is shown another beacon arrangement similar to that shown in Fig. 1 but in this case the transceiver 80 on the craft is coupled to an omni-directional antenna 81. On the ground repeater stations 84 and 86 are provided with rotatable directional transmitter arrangements. Preferably, the pattern from antenna 81 is substantially similar to patterns 13 and 18 shown in Fig. 1 and the patterns from antennas 82 and 85 are similar to the patterns shown in Figs. 2 and 3 except that the radiation is at an upward angle instead of downwardly.

A repeater system usable in the system of Fig. 8 is illustrated in Fig. 9. In this system is shown the rotatable antenna 87 driven at a desired speed by a motor 88. The pulses received from transceiver 80 are applied over coupler 89 to receiver detector equipment 90 producing in the output thereof a train of spaced pulses. The pulses are applied directly over line 91 to a combining circuit 99 and at the same time are applied in parallel over a delay means 92 to the combining circuit producing in the output of circuit 91 pairs of pulses 99A. Delay means 92 is made adjustable and is varied in adjustment in timed relation with rotation of antenna 87 so that the spacing between the pairs of pulses 99A is made variable with the direction of the radiation pattern. For example, this spacing may vary from zero time spacing, in the true north to a 500 microsecond spacing at 359°. The antenna may, for example, rotate at about ten revolutions per second and the recurrence frequency of the pulses may be about 2000 per second, that is, 200 pulses for one turn of the antenna. These spaced pulse pairs 99A are then applied to a transmitter 94. The modulated pulses in the output of 94 are applied to a blocker 95 which serves to block receiver detector 90 during the transmission of the signals and over delay means 96 and coupling 89 to antenna 87. Thus, the repeater of Fig. 9 serves to provide a radio beacon which distinguishes in direction by pulse spacing.

The transceiver equipment on the plane shown in Fig. 8 may comprise the circuit shown in Fig. 10 of the drawing. In this arrangement, the transmitting and receiving antenna 100 is coupled over coupler 104 to transmitter 101 and amplifier detector 105. Energy from a pulse generator 102 is applied over a delay means 103 to transmitter 101 and is applied directly to a blocker 106 which serves to block amplifier detector 105 during the periods of energy. The pulses thus transmitted, after repetition from the repeater of Fig. 9 are received on amplifier detector 105 and may be used to operate the sweep circuit generator 111. This sweep circuit generator may, for example, be a shock excited circuit to produce waves of a suitable frequency to sweep the beam around the face of the cathode ray indicator once for each pulse transmitted. The output from sweep circuit 111 is applied over couplers 112 and 117 to deflection plates 113 and 114. The first pulse of each of the pairs of pulses serves to control the sweep circuit. After the sweep has once started, the second pulse has no effect thereon. At the same time, the detected signals at the output of amplifier detector 105 are applied over coupler 108 to the control grid 109 of the indicator. Thus, the beam of the cathode ray indicator is swept around once for each of the pairs of pulses producing a first indication at 115 when the first pulse is received and a second indication at 116 is spaced therefrom. The spacing of this second indication, with respect to indication 115, provides a true reading of the direction of the craft with respect to the beacon.

If a distance indication as well as the direction indication is desired, a time base generator may be provided controlled by pulse generator 102. Furthermore, an electronic on-off switch 119 is provided timed with the pulses as generated so that time base generator 110 and coupler circuits 108 and 112 are rendered alternately unoperable. Thus, the first pulse may produce the circular sweep indication and the next pulse the time base indication. The energy from time base indicator 110 may be applied across electrodes 114 while, at the same time, the output from amplifier detector 105 is applied to vertical deflector plates 113 producing a pair of pulse indications 180, 181, as shown in the drawing. The screen may be so calibrated that the first pulse 180 serves to indicate the distance from the craft to the repeater. At the same time, the spacing between pulses 180 and 181 gives a measure of direction but this is not a convenient scale to use since both pulses will be displaced at different points along the screen dependent upon the distance of the craft from the beacon. As a consequence, such direction indication would be rather difficult to read.

In Fig. 11 is shown apparatus which may be replaced along the line 11—11 of Fig. 9 for the equipment shown to the right thereof. With this arrangement, the beacon station is not a repeater but serves merely as a transmitter of pulses delayed in spacing in accordance with the rotation of the antenna. Thus, energy from a pulse generator 200 is modulated by a suitable characteristic modulating signal from source 204 and is applied directly to combining circuit 202 and over adjustable delay line 201 to combining circuit 202. These combined signals are then applied to a transmitter 203 from whence they are radiated from antenna 87. This circuit provides a rotatable directive radio beacon on which pairs of pulses spaced apart in accordance with the direction on the beacon are transmitted.

On the craft, for cooperation with the beacon of Figs. 9 and 11, may be provided a simplified receiver circuit, such as shown at Fig. 12. The incoming pulse pairs are received on antenna 210 and applied to receiver detector 211. The first of these pulses serves to operate sweep circuit 213 over coupler 212 which, in turn, applies the voltage to deflector plates 214, 215. At the same time, the output of the receiver detector may be applied to a control grid 216 of the indicator so that the directional indications 217 are provided on the screen thereof. In order that a selection of a desired beacon is provided, a demodulator filter 218 is coupled to the output of receiver detector 211. This demodulator filter may be adjusted to select the desired characterizing signal of the radio beacon. Also, coupler 212 may be so designed as normally to block the output of receiver detector 211 from the indicator circuit. However, upon reception of signals containing the control signal selected in demodulator filter 218, unblocking signals are applied over line 220 to coupler 212 permitting these wanted pulses to be applied to the indicator. At the same time, a separate indicator 219 may be provided so that the operator will know that the desired signals are then being received.

The curves shown in Fig. 13 serve to illustrate the general principle of the directive beacon in accordance with the showing of Figs. 8 to 12. As shown in curve *e* of Fig. 13, pairs of pulses 300, 301 are transmitted. Pulses 301 may be varied in spacing, as indicated by the dotted line pulses shown in this curve. As illustrated, pulse 300 serves to produce the pairs of sine wave curves 302, 303 of curve *f* serving to sweep the cathode ray beam about the face of the tube. At the same time, if distance indications are desired, a sweep circuit generator, such as shown in Fig. 10 may be provided producing the curve shown at *g* of Fig. 13. Thus, there are provided alternate saw-tooth voltages 304 and blank or ineffective time base portions of the curve 305. During the period 305 the beam is swept once around the face of the tube while during the saw-tooth periods 304 the beam is swept across the face of the tube, as described more particularly in connection with Fig. 10.

While I have described some specific examples of my invention in connection with the accompanying drawings, it is clear that these examples are merely illustrative of the invention. Many modifications of the invention will readily occur to those skilled in the art. For this reason, the description thereof is not intended as any limitation on my invention, as set forth in the objects thereof and in the accompanying claims.

What is claimed is:

1. A system for guiding a craft to a selected one of a plurality of landing points, comprising a plurality of radio repeaters each arranged adjacent a predetermined landing area, means for giving to each said repeater a predetermined identifying transmitting signal characteristic, a circuit for said craft comprising a transmitter system for transmitting triggering pulses for triggering said repeaters, a receiver on said craft, means for rendering said receiver inoperative during transmission of said triggering pulses, adjustable means coupled with said receiver for rendering said receiver responsive to a selected one of said identifying characteristics, and indicator means responsive to the received signals for indicating the position of said craft with respect to said repeater transmitting said one of said identifying characteristics.

2. A system according to claim 1 wherein said identifying characteristics are respectively, different particular pulse repetition rates, said adjustable means comprising means for adjusting said transmitter to a selected particular pulse repetition rate, and said means for giving each repeater a predetermined identifying signal comprising means at each said repeater selectively responsive to pulses of different repetition rates for selectively rendering said repeaters operative to repeat only trains of pulses of their particular selective repetition rates.

3. A system according to claim 1, including means operatively associated with the receiver on said craft comprising a base circuit generator responsive to transmission of said triggering pulses for producing a base wave voltage, means for applying said base wave voltage to said indicator to produce a distance scale indication and means responsive to received repeated pulses for producing a distance indication on said scale.

4. A system for guiding an aircraft to a selected fixed transmitting station comprising a radio receiver mounted on said aircraft, a first radiant acting means coupled to said receiver, means for directing the radiation from said first radiant acting means generally downwardly, a radio transmitter means at said fixed station, a second radiant acting means coupled to said transmitter means, means for directing the radiation from said second radiant acting means generally upwardly, said first radiant acting means being directional in azimuth and constructed to produce a substantially unidirectional radiant acting pattern, the second fixed radiant acting means being substantially omnidirectional in azimuth, means for rotating said directional radiant acting means mounted on aircraft at a predetermined rate of speed, pulsing means coupled to said fixed transmitter for causing transmission of a series of pulses having a given characteristic, means in said receiver for receiving and detecting said transmitted pulses, and indicator means coupled to said receiver responsive to said detected pulses and the rotation rate of said directional aircraft radiant acting means for indicating the position of said craft with respect to said fixed station.

5. A system according to claim 4 wherein the rotating unidirectional radiant acting means is located at said aircraft, and wherein said indicator means comprises a cathode ray oscillograph, synchronously operated means for rotating the deflection field of said oscillograph at the rate of rotation of said unidirectional radiant acting means, and means responsive to said received pulses for producing an indication at the points of rotation of said beam indicating the position of said craft with respect to said fixed station.

6. A system for guiding an aircraft to a selected fixed transmitting station comprising a radio receiver mounted on said aircraft, a first radiant acting means coupled to said receiver, a radio transmitter means at said fixed station, a second unidirectional radiant acting means coupled to said transmitter means to produce a substantially unidirectional radiant acting pattern, the first radiant acting means being substantially omnidirectional in a horizontal plane, said radiant acting means both producing radiation components substantially vertically aligned therewith, means for rotating said directional radiant acting means at a predetermined rate of speed, pulsing means coupled to said transmitter for causing transmission of a series of pulses having a given characteristic, means coupled to said transmitter for producing a second series of pulses spaced in time from the pulses of said first series in accordance with the direction of said unidirectional radiant acting means, means for pulsing said transmitter with said second series of pulses to produce in cooperation with said first series of pulses radiated pairs of pulses, means in said receiver for receiving and detecting said transmitted pulses, and indicator means coupled to said receiver responsive to said detected pulses and the rotation rate of said directional radiant acting means for indicating the position of said craft with respect to said fixed station.

7. A system according to claim 6, wherein said indicator comprises a cathode ray oscillograph having a fluorescent screen, deflection field means tending to sweep the beam of said oscillograph over said screen, and means for producing an indication on said screen in response to said detected pulses in a position determined by the position of said directional radiant acting means.

8. A system according to claim 6 wherein said indicator comprises a cathode ray oscillograph having a fluorescent screen, a sweep circuit, means for timing said sweep circuit in accordance with the first pulse of said radiated pulse pairs to cause said beam to tend to sweep over said screen, and means for producing a direction indication on said screen in accordance with the second received pulses of said pulse pairs.

9. A system for guiding an aircraft to a predetermined landing station comprising a radio transmitter-receiver system mounted on said aircraft, a first radiant acting means coupled to said transmitter-receiver system, impulse generator means for energizing the transmitter of said receiver-transmitter system for the transmission of predetermined spaced pulses, receiver-blocker means responsive to the transmission of said impulses for blocking the receiver of said transmitter-receiver system during the periods of transmission therefrom, a radio repeater means at said landing station, said repeater means being responsive to pulses transmitted from the transmitter on said craft to repeat a series of pulses corresponding in spacing with the pulses received from said craft, a second radiant acting means coupled to said repeater means for receiving and retransmitting said pulses, one of said radiant acting means being directional and constructed to produce a substantially unidirectional radiant acting pattern, the other radiant acting means being substantially omnidirectional in a horizontal plane, the radiant acting means both having radiation components substantially vertically aligned therewith, means for rotating said directional radiant acting means at a predetermined rate of speed, said receiver portion of said transmitter-receiver means being adapted to receive said pulses from said repeater, means in said receiver means for detecting the repeated pulses and indicator means coupled to said receiver means responsive to said detected pulses and the rotation rate of said directional radiant acting means for indicating the position of said craft with respect to said landing station.

10. A system according to claim 9 wherein said rotating uni-directional radiant acting means is located on said aircraft and wherein said indicator means comprises a cathode ray oscillograph having a fluorescent screen, means for rotating the beam of said cathode ray oscillograph synchronously with rotation of said unidirectional radiant acting means and means responsive to said received pulses for producing an indication at points of rotation of said beam indicating the position of said craft with respect to said fixed station.

11. A system according to claim 9, wherein said rotating uni-directional radiant acting means is located on said aircraft and wherein said indicator means comprises a cathode ray oscillograph having a fluorescent screen, means for rotating the beam of said cathode ray oscillograph synchronously with rotation of said unidirectional radiant acting means, means responsive to said received pulses for producing an indication at points of rotation of said beam indicating the position of said craft with respect to said fixed station, means on said craft responsive to impulses from said impulse generator to produce a time base voltage, means for applying said time base voltage to said oscillograph to produce radial deflection of said beam in accordance with said time base voltage and means for rotating said time base voltage applying means about said cathode ray tube in synchronism with the rotation of said cathode ray beam whereby said indications produce an indication of distance as well as direction on said indicator.

12. A system according to claim 9 wherein said rotating uni-directional radiant acting means is located at said landing station further comprising time delay means in said repeater system for producing a second time-delayed pulse spaced from said repeated pulse, means for controlling the spacing of said second pulse with respect to said repeated pulse in accordance with the directional position of said rotating unidirectional means and means for transmitting said delayed pulses to produce with said repeated pulses, pairs of radiated pulses spaced apart in accordance with the directional adjustment of said uni-directional radiant acting means.

13. A system according to claim 9 further comprising means at said repeater means for transmitting a second pulse in response to each received pulse with a spacing from said retransmitted pulses indicative of direction, said indicator comprising a cathode ray oscillograph having a fluorescent screen, a sweep circuit, means for timing said sweep circuit in accordance with said retransmitted pulses and means for producing a direction indication on said screen in accordance with said second pulses.

14. A receiver circuit for indicating direction in response to received pairs of pulses spaced apart by different time intervals indicative of direction of the receiver circuit with respect to the source of said pulses, comprising means responsive to the first received of said pulses for producing a sweep scale corresponding to the limits of the spacing of the pulses of said pairs, and means for indication on said scale the time of reception of the second pulse of said pairs to provide said direction indication.

15. A beacon transmitter system comprising a transmitter, a rotatable directive antenna coupled to said transmitter, a pulse source, a variable delay line and another line coupled to said source, combining means for combining said variably delayed pulses and the pulses from said another line to provide spaced pairs of pulses, means for applying said spaced pairs of pulses to key said transmitter, and means for rotating said directive antenna and simultaneously controlling the delay of said variable delay line, whereby the spacing of the pulses of said pairs is indicative of the direction of said antenna.

16. A radio guiding system for a craft to guide it to a selected one of a plurality of radio beacon systems, each said beacon system, including a pulse transmission means, being defined by a predetermined identifying signal and each comprising different pulse repetition rates, comprising means for receiving energy from said beacon stations, detecting means for detecting said received signals, signal selector means in the output of said detecting means adjustable to a selected one of said identifying signals, and indicator means responsive to receipt of said selected identifying signal to indicate the direction with respect to the beacon provided with said selected identifying signal.

17. A system for guiding an aircraft to a selected fixed transmitting station comprising a radio receiver mounted on said aircraft, a first radiant acting means coupled to said receiver, a radio transmitter means at said fixed station, a second radiant acting means coupled to said transmitter means, one of said radiant acting means being directional and constructed to produce a substantially unidirectional radiant acting pattern, the other radiant acting means being substantially omnidirectional in a horizontal plane, said radiant acting means both producing radiation components substantially vertically aligned therewith, means for rotating said directional radiant acting means at a predetermined rate of speed, pulsing means coupled to said transmitter for causing transmission of a series of pulses having a substantially fixed pulse spacing, means for modulating said pulses in accordance with an identifying signal, means in said receiver for receiving and detecting said transmitted pulses, means for separating out the modulation from said detected pulses to obtain said identifying indication, and indicator means coupled to said receiver responsive to said detected pulses and the rotation rate of said directional radiant acting means for indicating the position of said craft with respect to said fixed station.

18. A system for guiding an aircraft to a selected fixed transmitting station comprising a radio receiver mounted on said aircraft, a first radiant acting means coupled to said receiver, a radio transmitter means at said fixed station, a second radiant acting means coupled to said transmitter means, one of said radiant acting means being directional and constructed to produce a substantially unidirectional radiant acting pattern, the other radiant acting means being substantially omnidirectional in a horizontal plane, said radiant acting means both producing radiation components substantially vertically aligned therewith, means for rotating said directional radiant acting means at a predetermined rate of speed, pulsing means coupled to said transmitter for causing transmission of a series of pulses having a predetermined repetition rate identifying the station, means in said receiver for receiving and detecting said transmitted pulses, means for selecting pulses of different repetition rates, means to adjust said receiver to said predetermined repetition rate so that only pulses of said predetermined repetition rate will be selected, and indicator means coupled to said receiver responsive to said selected pulses and the rotation rate of said directional radiant acting means for indicating the position of said craft with respect to said fixed station.

19. A radio guiding system for a craft to guide it to a selected one of a plurality of radio beacon systems, each said beacon system being identified by discrete pulse signals of respectively different pulse repetition rate, comprising means for receiving energy from said beacon stations, detecting means for detecting said received signals, pulse selector means in the output of said detecting means adjustable to select a desired one of said pulse repeating rates and indicator means responsive to receipt of said selected pulses to indicate the direction with respect to the beacon provided with said selected identifying signal.

20. The method of guiding a craft with respect to a selected one of a plurality of radio beacon systems, comprising transmitting from each beacon predetermined discrete pulse signals of different repetition rates, receiving at said craft energy from said beacon stations, detecting said received energy, adjustably selecting from said detected energy a selected one of said signals in accordance with its pulse repetition rate, and producing a directive signal indication in response to said selected one of said identifying signals.

HENRI G. BUSIGNIES.

REFERENCES CITED

The following references are of record in the file of this patent:

UNITED STATES PATENTS

| Number | Name | Date |
|---|---|---|
| 2,183,634 | Zworykin | Dec. 19, 1939 |

FOREIGN PATENTS

| Number | Country | Date |
|---|---|---|
| 468,918 | Great Britain | July 15, 1937 |